United States Patent [19]
Bosisio et al.

[11] Patent Number: 5,455,881
[45] Date of Patent: Oct. 3, 1995

[54] HYDROGEN-ABSORBING COMPOSITION FOR OPTICAL FIBER CABLES AND OPTICAL FIBER CABLES INCORPORATIONS SUCH COMPOSITION

[75] Inventors: Claudio Bosisio, Brembate Sotto; Antonio Campana, Milan, both of Italy

[73] Assignee: Pirelli Cavi S.p.A., Milan, Italy

[21] Appl. No.: 257,266

[22] Filed: Jun. 9, 1994

[30] Foreign Application Priority Data

Jun. 29, 1993 [IT] Italy ................ MI93A1398

[51] Int. Cl.⁶ .................................... G02B 6/44
[52] U.S. Cl. .................. 385/100; 385/105; 385/109; 523/173
[58] Field of Search .............. 385/100–114, 141, 385/143, 145; 523/173

[56] References Cited

U.S. PATENT DOCUMENTS

| | | | |
|---|---|---|---|
| 4,688,889 | 8/1987 | Pasini et al. | 385/128 |
| 4,717,236 | 1/1988 | Dewing | 385/109 |
| 4,718,747 | 1/1988 | Bianchi et al. | 385/143 X |
| 4,725,123 | 2/1988 | Anelli et al. | 385/100 |
| 4,741,592 | 5/1988 | Secco et al. | 385/100 |
| 4,826,278 | 5/1989 | Gartside, III et al. | 385/105 |
| 5,258,435 | 11/1993 | Huggins et al. | 385/141 X |

FOREIGN PATENT DOCUMENTS

| | | | |
|---|---|---|---|
| 0217066 | 4/1987 | European Pat. Off. | G02B 6/44 |
| 0464918A1 | 1/1992 | European Pat. Off. | G02B 6/44 |
| 2144559 | 3/1985 | United Kingdom | G02B 6/44 |
| 2167424 | 5/1986 | United Kingdom | G02B 6/44 |
| 2172410 | 9/1986 | United Kingdom | G02B 6/44 |

OTHER PUBLICATIONS

JP–A– 4 045 187 (Dainippon) Patent Abstracts of Japan vol. 016, No. 228 (C–944) 27 May 1992.
Patent Abstracts of Japan vol. 014, No. 261 & JP–A–02 075 657 (Mitsubishi) 15 Mar. 1990.
Japanese Patent Abstracts of Japan, vol. 14, No. 004 (P–986) 9 Jan. 1990 and JP–A–01 255 812 (NTT) 12 Oct. 1989.

*Primary Examiner*—John D. Lee
*Attorney, Agent, or Firm*—Brooks Haidt Haffner & Delahunty

[57] ABSTRACT

A hydrogen-absorbing composition for optical fiber cables comprises a catalyst selected from the group including the transition metals, their salts and organic and inorganic complexes, and a hydrocarbon compound including at least 90% of a substantially homogeneous, silicon-free hydrocarbon not obtained by polymerization of monomers including conjugate dienes and having double bonds reactive to hydrogen at room temperature in a corresponding amount to an iodine number in the 70 to 1,000 mg/g range; a viscosity in the 500 to 70,000 cSt range at room temperature, and a viscosity at room temperature lower than 70,000 cSt after ageing by exposure to air, in thin layer, for at least 7 days at 100° C. Fiber optic cables according to the invention comprise at least one optical fiber received in a respective housing and, in at least an internal volume portion, an effective amount of said hydrogen-absorbing composition.

30 Claims, 4 Drawing Sheets

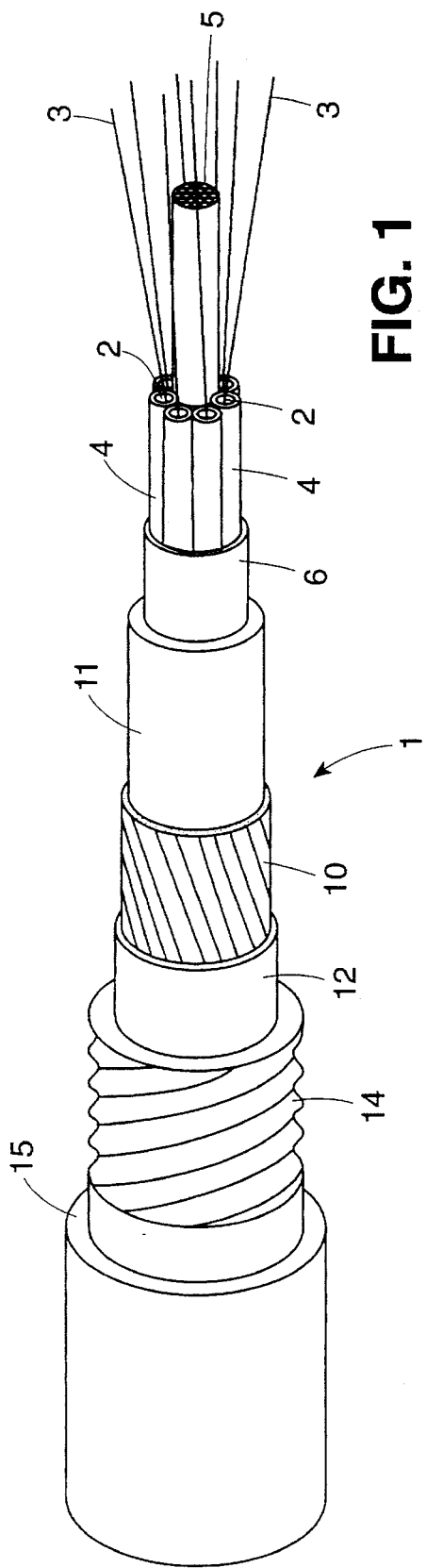
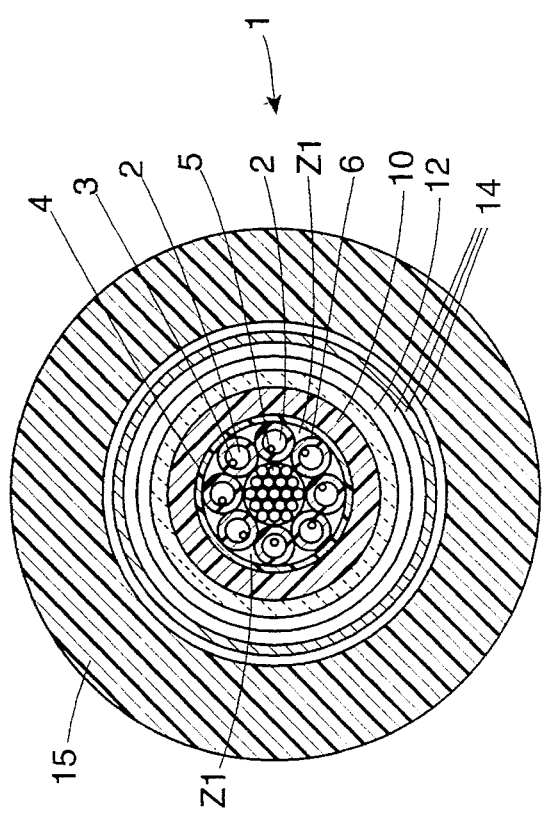

HYDROGEN-ABSORBING COMPOSITION FOR OPTICAL FIBER CABLES AND OPTICAL FIBER CABLES INCORPORATIONS SUCH COMPOSITION

DESCRIPTION

This invention broadly relates to optical fiber cables incorporating a hydrogen-absorbing composition.

The invention specifically concerns a hydrogen-absorbing composition preferably, though not exclusively, useful in optical fiber cables of the so-called waterproof type, such as submarine cables.

As is known, a particular requisite with optical fiber cables is that the optical fibers should be protected as best as possible against attenuation of the signal transmitted therethrough.

A well-recognized cause for attenuation of the signal propagated by means of optical fibers is the hydrogen diffusion into the fibers.

Hydrogen diffusion into optical fibers is to be especially guarded against in the instance of waterproof cables for submarine applications, where hydrogen may be released over the years from the metal or plastics sheaths provided to protect the optical fibers, or from the cable metal armours.

It is believed, in particular, that hydrogen may originate from degradation processes of the plastics material used for the sheaths and/or from corrosion of the metal parts induced by the condensates which may form at the operating temperatures of the cable.

In order to control the optical signal attenuation induced by hydrogen diffusion, the related prior art has proposed several different approaches based on the use of materials which may bond the hydrogen before it may contact the optical fibers.

Substances have been used for this purpose which can physically adsorb the hydrogen in a reversible manner, or absorb it chemically in an irreversible manner.

As is known from e.g. patent application GB 2,144,559, the hydrogen is physically adsorbed using either a palladium wire provided in the optical fiber receiving tube(s), or a water-impermeable grease introduced in such tubes and mixed with a compound which can adsorb the hydrogen physically.

Polybutenes, activated charcoal, palladium, saturated or unsaturated hydrocarbons incorporated into said grease have been proposed as alternative adsorbing compounds.

However, physically adsorbent systems have proved hardly effective to block hydrogen diffusion through the optical fibers due to the reversible hydrogen-to-adsorbent bond and the low ability or substantial inability of the adsorbent to stably bond the hydrogen under the pressure and temperature conditions of the cables, especially submarine cables.

As for the absorbing systems by chemical reaction, it is known from U.S. Pat. Nos. 4,688,889 and 4,741,592 to respectively use, as compounds adapted to react chemically with hydrogen, polysiloxanes including unsaturated groups and polymers obtained from conjugate dienes, in the presence of an appropriate catalyst.

The chemical hydrogen-absorbing systems based on the use of polysiloxanes, while substantially achieving their goal, still have a drawback in that such products are difficult and expensive to procure from the market, while the systems based on the use of polymers obtained from conjugate dienes pose problems due to the polymer reactivity, making them liable to oxidation phenomena which result, under certain conditions, in the polymers overcuring when exposed to air.

In developing this invention, it has been found that a hydrogen-absorbing composition for optical fiber cables which is particularly effective to irreversibly react with hydrogen under the cable operating conditions can be obtained by a combination of such properties such as the degree of unsaturation, viscosity, resistance to oxidation, and substantial constitutive homogeneity.

Accordingly, this invention provides an optical fiber telecommunication cable comprising at least one optical fiber received in a respective housing of an optically conductive core, and arranged in at least a portion of its internal volume, and comprising a hydrogen-absorbing composition including:

a hydrocarbon compound; and a catalyst selected from a group including the transition metals, salts and organic and inorganic complexes of the transition metals; characterized in that said hydrocarbon compound comprises at least 90% of a substantially homogeneous silicon-free hydrocarbon which is not obtained by polymerization of monomers including conjugate dienes, and having as such, a viscosity in the 500 to 70,000 cSt range at room temperature; and a viscosity below 70,000 cSt at room temperature, after ageing by exposure to air in thin layer for at least 7 days at 100° C.;

said hydrocarbon compound having double bonds reactive to hydrogen at room temperature, in a corresponding amount to an iodine number in the 70 to 1,000 mg/g range.

In accordance with another aspect, this invention relates to a hydrogen-absorbing composition of a kind which comprises a hydrocarbon compound and a catalyst selected from a group which includes the transition metals, salts and organic and inorganic complexes of the transition metals, which composition is characterized in that said hydrocarbon compound comprises at least 90% of a substantially homogeneous silicon-free hydrocarbon, not obtained by polymerization of monomers including conjugate dienes, and having as such:

a viscosity in the 500 to 70,000 cSt range at room temperature; and a viscosity below 70,000 cSt at room temperature after ageing by exposure to air, in thin layer, for at least 7 days at 100° C.;

said hydrocarbon compound having double bonds reactive to hydrogen at room temperature, in corresponding amount to an iodine number in the 70 to 1,000 mg/g range.

Throughout this description and the appended claims, the expression "substantially homogeneous hydrocarbon" means a silicon-free oily organic compound which has a molecular weight distribution about a mean value varying within a limited range, such that it will show no significant phase separation phenomena by decantation or chromatography on a fibrous support.

According to the invention, the hydrogen absorption value indicated above can be obtained using an unsaturated hydrocarbon with double bonds, which can react with hydrogen at room temperature in the presence of an appropriate catalyst. In such compounds, the capacity to absorb hydrogen is tied to the number of double bonds within the molecule.

However, many unsaturated hydrocarbons change in consistency following hydrogenation, from a low viscosity fluid state to a substantially solid state, or a very high viscosity fluid state. It has been found, for example, that polymers obtained from conjugate dienes, inherently highly reactive to hydrogen, exhibit in certain conditions an objectionably high viscosity, to the point of becoming, in fact, substantially solid on exposure to air.

Such problems are mainly attributed to the high reactivity of the polymers in question which render the latter prone to oxidation and polymerization phenomena.

This drawback has been in particular experimentally observed by the Applicant with polybutadiene. A similar situation is encountered with oily substances which have a large number of double bonds, such as 9-octadecenoic acid, or oleic acid.

Oleic acid on the one side has a very high hydrogen absorbing capability—equal to about 22 Nml/g—on the other side is transformed into stearic acid upon hydrogenation, a substance which is solid at room temperature and accordingly unable to provide the required cushioning function.

It is believed that such alterations or hardening phenomena are due to the large number of highly reactive double bonds involving the formation of additional bonds, or in any event, of highly viscous solid compounds.

Thus, in developing this invention, it was understood that the reactivity of the hydrocarbon compound which is to chemically absorb the hydrogen ought to be closely controlled and that, whereas on the one hand, it is desirable that such reactivity be sufficiently high to ensure adequate protection to the optical fibers, on the other hand, it should not exceed the maximum value indicated above, if the aforementioned side effects are to be prevented.

Furthermore, the reactive characteristics of the hydrocarbon compound should be combined with its viscous characteristics in view of the special conditions of preparation and use in an optical fiber cable.

While desired levels of reactivity and viscosity of a substance could be apparently attained rather easily by using a mixture of a first highly reactive compound and a second, non-reactive compatible compound, that is by mixing a low viscosity compound and a high viscosity one, the Applicant has found that the resultant composition is liable to demixing and separation of its components to the point that it will loose its very features of interest.

It has been also found that all of the above critical conditions can be met at one time through the use of substantially homogeneous hydrocarbons having a number of reactive double bonds which is dependent on their mean molecular weights and corresponds to a iodine number in the 70 to 1,000 mg/g range, and having viscosities which vary within a critical range before and after the absorption of hydrogen, and following a possible exposure to air.

In particular, it has been found that, in order to allow the preparation of the hydrogen absorbing composition and ensure its long-term stability, said unsaturated hydrocarbon should preferably have a viscosity in the 1,000 to 30,000 cSt range at the mixing temperature.

The room-temperature viscosity of such an unsaturated hydrocarbon, moreover, should be such as to allow the addition of a sufficient amount of a thickening agent to impart thixotropic characteristics to the composition, whereby it could be applied to the cable and held in its selected position in the final cable.

Preferably, the composition of this invention is made thixotropic by incorporating thereto a suitable thixotroping agent, such as pyrogenous silica.

In accordance to the present invention, it was found that a hydrocarbon having an excessively low viscosity does not allow the preparation of a thixotropic composition which is stable at the final viscosity sought; in fact, if the thixotropic composition comprises a low-viscosity fluid, surface separations of the fluid components of the composition, which alter the theological and hydrogen-absorbtion properties of the latter, are observed within a time period that varies between a few days and a few weeks.

On the other hand, a hydrocarbon with too high a viscosity would make the incorporation of the silica and the hydrogenation catalyst difficult or impossible to carry out due to the high shear forces required to disperse the solid particles through the hydrocarbon.

Furthermore, an excessive initial viscosity of the basic hydrocarbon would make the application of the composition to the cable impractical, if not altogether impossible.

It has been found, in fact, that in such a case the shear stresses to which the composition is subjected during its application are inadequate to ensure its required flowability inside the cable (in addition to jeopardizing its cushioning effect on the optical fibers embedded therein).

According to the invention, examples of substantially homogeneous hydrocarbons useful in the hydrogen-absorbing composition include: polybutene; propylene-ethylene, propylene-butene and propylene-hexene copolymers; propylene-butene-ethylene terpolymers; synthetic or naturally occurring (castor oil) glyceryl ricinoleate; rosin oil (a hydrocarbon compound obtained by decarboxylating colophony), and the like.

Preferred among the above-mentioned hydrocarbons is, for the purpose of this invention, polybutene.

Throughout the following description and the appended claims, the term "polybutene" will be used to indicate a linear- or branched-chain polyolefin obtained by polymerization of olefines with 4 carbon atoms, including butene-1, butene-2, and isobutene.

For use in this invention, polybutenes having a numerical mean molecular weight in the 500 to 1,100 range, a kinematic viscosity at 25° C. in the 1,000 to 50,000 cSt range and a degree of unsaturation in terms of iodine number in the 300 to 800 mg/g range, are preferred.

Specifically, the polybutenes of this invention preferably comprise at least $2 \times 10^{-6}$ moles/g of unsaturated groups, and preferably a number of unsaturated groups exceeding $1.1 \times 10^{-3}$ moles/g.

Preferably, the number of unsaturated polybutene groups should be such as to absorb, at room temperature (25° C.), at least 1.15 Nml/g of hydrogen in the presence of a suitable catalyst, as explained hereinafter.

For the purpose of this invention, moreover, polybutenes having a distribution of molecular weights in the ±20% range with respect to the numerical mean molecular weight is particularly preferred.

A composition including such polybutenes has revealed, in fact, no significant demixing phenomena for the purpose of this invention, contrary to what was observed in the instance of an equally proportioned mixture of two commercial polybutene fractions having molecular weights of 450 and 1,250, respectively, which separated significantly on a fibrous support with a gap size of about 20 micrometers.

Further, the polybutenes for use in this invention preferably have a kinematic viscosity at room temperature (25° C.)

which does not exceed 70,000 cSt following exposure to air at 100° C. for 7 days, in thin layer (5 mm).

Among the substantially homogeneous hydrocarbons, according to the invention, castor oil and rosin oil having the characteristics shown in the following table may also be used to advantage.

| Material | Castor Oil | Rosin Oil |
| --- | --- | --- |
| Viscosity (cSt, 25° C.) | 900 | 2,200 |
| Viscosity (cSt, 50° C.) | 144 | 165 |
| Viscosity (cSt, 100° C.) | 20 | 12.1 |
| Iodine Number (mg/g) | 85 | 100 |
| $H_2$ Absorb. (Nml/g) | 7.66 | 3.18 |

According to the invention, another requirement of the hydrogen-absorbing composition is that it should be substantially homogeneous in nature.

In particular, the expression "substantially homogeneous composition" means a composition having a degree of affinity of its components such that no segregations or separations would occur of any of the components by chromatographic effect on a fibrous support.

Advantageously, and in accordance with a further aspect of the invention, amounts of up to 5% by weight of a second, substantially homogeneous unsaturated hydrocarbon will yield particularly effective hydrogen-absorbing compositions.

For the purpose of this invention, said second unsaturated hydrocarbon is selected from unsaturated polymers obtained by polymerization of at least one conjugated diene.

Specifically, this second unsaturated hydrocarbon may be, for the purpose of this invention, a homopolymer, copolymer, or terpolymer, possibly linked to monomers having at least one unsaturated group.

Preferred are those obtained by polymerization of butadiene, pentadiene, methyl-butadiene, and 2-chlorobutadiene.

Polybutadiene with a numerical mean molecular weight in the 1,500 to 2,000 range is particularly preferred.

Other unsaturated polymers obtained by polymerization of at least one conjugate diene and eligible for use in this invention are, for example, those described in U.S. Pat. No. 4,741,592, whose specification is herein incorporated by reference.

It has been found that in order to ensure optimum theological and stability characteristics over time and on exposure to air, the amount of this second unsaturated hydrocarbon present in the composition of the present invention should preferably be less than 2% by weight, and in no case exceed the above-mentioned limit of 5% by weight.

The composition of this invention reacts with hydrogen at room temperature, in the presence of at least one catalyst selected from a group including the transition metals, as well as the salts or organic and inorganic complexes thereof.

The above catalyst may be used as such, supported on any suitable inert material, or in any other suitable form.

Among the catalysts of this invention, preferred are: powdered platinum, powdered palladium, powdered nickel, organic or inorganic salts or complexes of said metals, iron pentacarbonyl, optionally supported on a suitable inert material.

Among the latter, particularly preferred is palladium on charcoal, known in the art as palladium charcoal.

Other suitable catalysts for use in this invention are described, for example, in U.S. Pat. No. 4,688,889, the specification of which is herein incorporated by reference.

Where the inventive composition is to be used in direct contact with the optical fibers, palladium catalysts in the form of salts, soluble complexes, or particles having a particle size smaller than 5 micrometers are particularly preferred.

Any attenuation of the optical signal due to the phenomenon known as microbending may then be substantially prevented.

The amount of catalyst in the inventive composition lies typically between 0.005% and 1% by weight of palladium, and is preferably of 0.0125% by weight of palladium, which corresponds to an amount between 0.1% and 2% by weight, preferably of 0.25% by weight, of palladiate charcoal with 5% palladium.

In accordance with this invention, the rheological characteristics of the composition which proved critical, specifically the thixotropic characteristics sought, can be obtained by adding 1% to 20% by weight, preferably 4% to 8% by weight, of an appropriate thixotroping agent.

Among such appropriate agents, preferred is a submicroscopic colloidal silica known as "flame" silica, obtained by hydrolyzing silicon tetrachloride at 1,100° C., with has a surface area in the 200 to 400 $m^2$/g (BET) range and a particle size in the 0.07 to 0.012 mm range.

Understandably, the inventive composition may include other additives, known per se, such as antioxidants, in amounts which can be readily determined by the person skilled in the art.

In accordance with the invention, peculiar advantages are achieved thanks to the substantial homogeneity of the above hydrogen absorbing composition.

Thus, the compositions of this invention may be used to advantage as impregnating agents of the fibrous sheaths which surround the core of the optical fiber cable, without undergoing segregations or phase separations by chromatographic effect of any of their components.

Further features and advantages will become apparent from the following description of some examples of hydrogen-absorbing compositions and optical fiber cables according to the invention, given by way of illustration and not of limitation with reference to the accompanying drawings.

IN THE DRAWINGS:

FIG. 1 shows a perspective view of an optical fiber cable incorporating the hydrogen-absorbing composition of this invention;

FIG. 2 is a cross-sectional view of the cable in FIG. 1;

Figure 3:
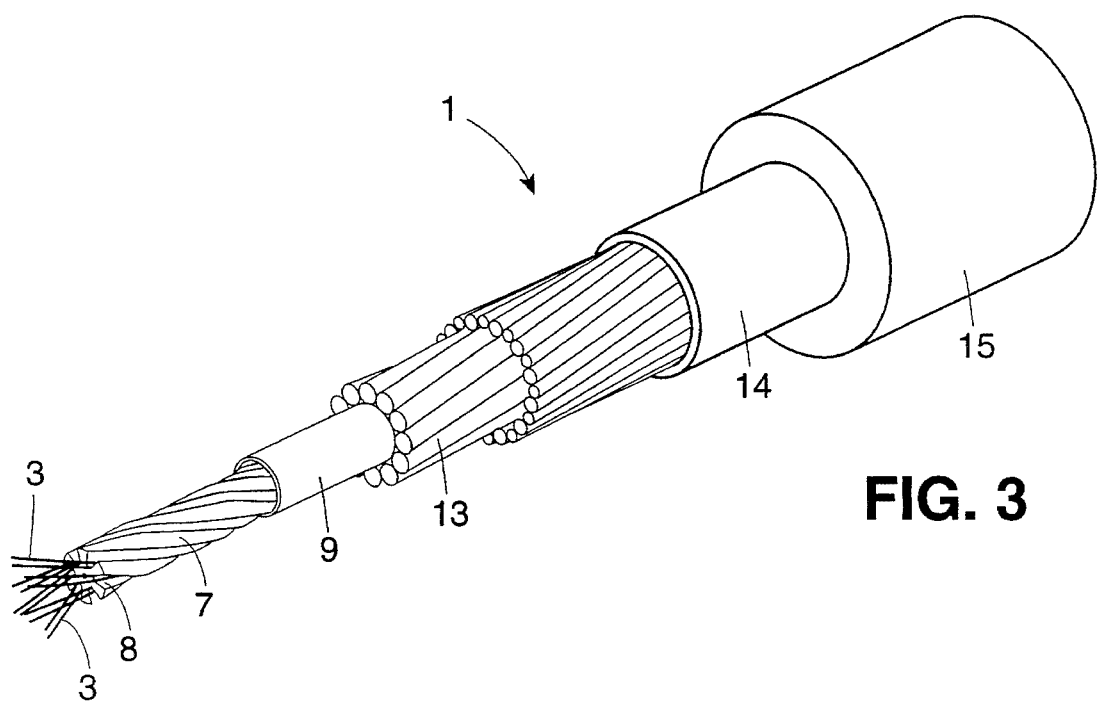
FIG. 3 shows a perspective view of an alternative embodiment of an optical fiber cable incorporating the hydrogen-absorbing composition of this invention.

With reference to FIGS. 1 to 4, an optical cable according to this invention comprises an optical core 1 provided with housings 2 wherein one or more optical fibers 3 are supported, preferably in a loose fashion.

In the exemplary embodiment shown in FIGS. 1 and 2, the optical core 1 comprises a plurality of tubes 4, preferably made of a plastics material, which are stranded around a central support 5 and defining respective housings 2 for the optical fibers 3 which are enveloped by a sheath 6.

Figure 4:
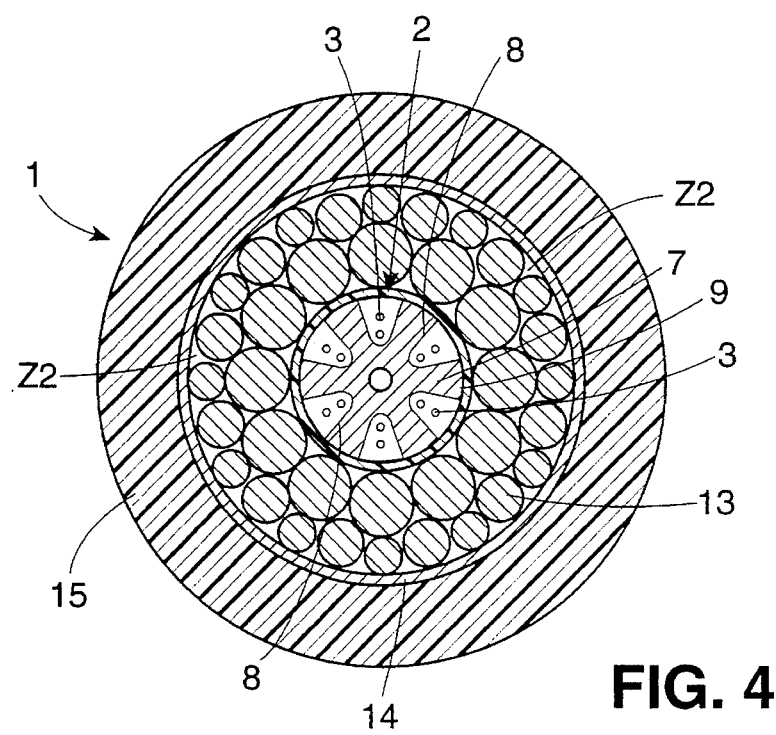
FIG. 4 is a cross-sectional view of the cable in FIG. 3.

In the embodiment shown in FIGS. 3 and 4, the optical core 1 comprises a grooved core 7 having one or more helical grooves 8 which are closed on the outside by one or more layers of tape sheaths 9 to define a plurality of housings 2 for the optical fibers 3.

Cable tension members are then associated with the optical core 1 which are either laid axially or peripherally according to the constructional or use requirements of the cable.

In the example shown in FIGS. 1 and 2, the tension members are of the dielectric type and comprise a double layer of high-tensile fibers 10, such as fibers of an aromatic polyamide or Kevlar (Registered Trademark).

Interposed between the Kevlar fibers 10 and the sheath 6 enveloping the tubes 4, is a polyurethane sheath 11, while a further sheath 12 is laid over the Kevlar fibers 10.

In the embodiment shown in FIGS. 3 and 4, the tension members comprise one or more layers of steel wires 13 stranded around the sheath 9 of the optical core 1.

Should it prove expedient or desirable in further embodiments that the dielectric or metal tension members be axially positioned, wholly or in part, these may be placed inside the support 5 or the core 7, or alternatively, be an integral part thereof.

For the purpose of this invention, it should be noted that while in the embodiment shown by way of example in FIGS. 1 and 2 the optical core of the "tube" type has been associated with tension members of the non-metal type, and in the embodiment shown by way of example in FIGS. 3 and 4 the optical cope of the grooved type has been associated with metal tension members, the tube-type optical core could be used along with metal tension members, and the grooved optical core used along with dielectric tension members, or alternatively said cores could be associated with different tension members in shape and nature, as may best suit specific conditions of use.

The fiber optics cable further comprises, both in the embodiment of FIGS. 1 and 2 and the embodiment of FIGS. 3 and 4, a metallic tubular member 14, effective to provide the optical core with the desired moisture-proof, gas-proof and the like properties, and an outer sheath 15, e.g. of polyethylene.

The tubular metal member 14 is preferably formed from a strip folded into a tube and seam welded lengthwise, which strip may be made of steel, copper, or the like, or made of aluminum with overlapping edges sealed together by means of an adhesive material.

Where needed for improved flexibility of the cable, the member 14 may be corrugated as shown in FIG. 1.

Irrespective of the construction of the optical core 1, it is common practice to employ, for land applications, cables which incorporate dielectric tension members, whereas for submarine applications, cables incorporating tension members made of metal, usually high tensile steel, are preferred.

In submarine applications, the above-described cable may be completed with additional outer armours of metal to provide a required amount of protection for the optical core under its designed conditions of use.

Inside the housings 2, as well as in the interstices Z1 between the tubes 4, a cushioning composition is provided, e.g. one based on a thixotropic mineral oil or grease, in order to inhibit any water or moisture penetrated into the cable from spreading through the cable itself and to provide adequate dampening for the optical fibers 3 within the housings 2.

Additionally, the sheaths 6, 9 conveniently comprise one or more layers of a fibrous material, also impregnated with the cushioning composition.

In the instance of submarine cables, the interstices Z2 between the steel wipes 13 on the tubular metal member 14 interior are also filled with the cushioning composition.

In accordance with the present invention, hydrogen which may have entered the cable or has been released within the cable by any degradative process of its components, is chemically absorbed in an irreversible manner using, as the cushioning composition, any of the previously described hydrogen-absorbing compositions, incorporated in the cable at one or more of the aforesaid locations.

Since the amount of hydrogen-absorbing composition that may be incorporated into the cable is necessarily limited by the available volumes within the cable structure, its unitary absorbing capacity should ensure absorption of the full amount of hydrogen that can be released from a cable over its service lifespan.

As an example, if this amount is (e.g., fop a cable service lifespan of 30 years) estimated at $5 \times 10^{-5}$ moles/m and the amount of the hydrogen-absorbing composition that can be applied is 1.4 g/m, then a hydrogen-absorbing composition capable of absorbing no less than 0.8 Nml/g of hydrogen is required to be impregnated or coated on the sheaths 9 of the cable as shown in FIGS. 3 and 4.

Where the hydrogen-absorbing composition is applied in larger amounts of up to 10–12 g/m, e.g. as a filler in the spaces between tubes 4 of armour wires 13, or inside the tubes 4 of the grooves 8, an absorption power of 0.2 Nml/g may also be adequate if it can be applied in contact with the optical fibers.

For the purpose of this invention, it is believed that compositions having a hydrogen-absorbing capacity of less than about 0.2 Nml/g cannot be of practical interest For the cable applications under consideration.

Some examples of hydrogen-absorbing compositions according to the invention will now be given in relation to the foregoing description, merely for illustration purposes.

EXAMPLE 1

A hydrogen-absorbing composition according to U.S. Pat. No. 4,688,889, comprising a 1:1 ratio mixture of two unsaturated silicone oils having respective viscosities of 200 cSt and 10,000 cSt at 25° C., was spread onto a tape of polyester fiber with maximum web apertures of about 20 micrometers.

The hydrogen-absorbing capacity of the composition was measured, using the procedure of Example 2 below, either immediately after preparation or after 7 days at 65° C.

A reduction in hydrogen-absorbing capacity equal approximately to 50% of the starting value was found on testing.

On the same tape, a hydrogen-absorbing composition comprising a single fraction of silicone oil with a viscosity of 5,000 cSt showed a reduction in hydrogen-absorbing capacity not exceeding 10% under the same conditions.

Under the same conditions, a composition containing equal parts of polybutene with a viscosity of 300 cSt at 25° C. and mineral oil (saturated hydrocarbon) with a viscosity of 10,000 cSt at 25° C., as well as 0.25% by weight of a catalyst (palladiate charcoal) and 5% of silica, showed a decrease in hydrogen-absorbing capacity of about 50%.

It is believed that the observed effects are due to capillarity (chromatography) demixing phenomena on the fibrous support, with a consequent formation in the composition of areas with different viscosities which alter the cushioning performance of the latter in the cable, and separation of the catalyst from the hydrocarbon, all this adversely affecting the hydrogen-absorbing capacity of the composition.

It should be further noted that demixing effects may also appear, e.g. by decantation, during storage of the composition ready for use in a cable.

Since fibrous supports are commonly present in a cable, especially in the sheaths 6 or 9 thereof, and a storage period of the composition is usually provided for, the observed demixing effects make the use of non-homogeneous compositions inappropriate where mixtures of different substances are present in substantial amounts therein.

As brought out by Example 1, while it might have been assumed that the final viscosity properties could be obtained using a suitable mixture of hydrocarbons with different properties, it is only through a homogeneous hydrogen-absorbing composition that all of the requisite properties for use in a optical fiber cable can be obtained.

EXAMPLE 2

A composition comprising, expressed as percentages by weight of its overall weight:

| | |
|---|---|
| Polybutene | 94.35 |
| Catalyst | 0.25 |
| Pyrogenous silica (2–300 Angstroms) | 5.00 |
| Antioxidant (Irganox 1076) | 0.4 | was obtained using a polybutene having the following characteristics:

| | |
|---|---|
| Numerical mean molecular weight | 800 |
| Kinematic viscosity at 25° C. (cSt) | 10.000 |
| Iodine Number (mg/g) | 537 |

The resultant composition exhibited the following physical properties:

| | |
|---|---|
| Viscosity (at a shear rate of 1.56 s$^{-1}$) (Pa × s) | 380 |
| Density at 20° (g/cm$^3$) | 0.92 |
| Dripping point | above 200° C. |

The catalyst consisted of palladium on a charcoal support, with average particle size of about 30 micrometers and a Pd content of 125 ppm with respect to the overall weight of the composition.

The catalyst was incorporated into the polybutene at room temperature by dispersion using a paddle stirrer; the product thus obtained was immediately thickened, while still under powerful constant stirring, by the addition of the colloidal silica powder.

Finally, the mixture was homogenized on a three-cylinder refiner.

The preparation of the composition posed no problems; after a stay period of 7 days no phase separation or demixing phenomena were observed on its surface.

EXAMPLE 3

A hydrogen-absorbing composition as per Example 2 above was prepared using polybutene having the following characteristics:

| | |
|---|---|
| Numerical mean molecular weight | 950 |
| Kinematic viscosity at 25° C. (cSt) | 28,000 |
| Iodine Number (mg/g) | 349 |

EXAMPLE 4

A hydrogen-absorbing composition as per Example 2 above was prepared using polybutene having the following characteristics:

| | |
|---|---|
| Numerical mean molecular weight | 450 |
| Kinematic viscosity at 25° C. (cSt) | 300 |
| Iodine Number (mg/g) | 916 |

The silica content of the composition was raised to a value of about 7% so as to obtain a final viscosity of about 400 Pa × s at a shear rate of 1.56 s$^{-1}$.

After a stay period of 7 days, a demixed fraction appeared on the surface of the composition.

EXAMPLE 5

A hydrogen-absorbing composition as per Example 2 above was prepared using polybutene with the following characteristics:

| | |
|---|---|
| Numerical mean molecular weight | 1,250 |
| Kinematic viscosity at 25° C. (cSt) | 90,000 |
| Iodine Number (mg/g) | 300 |

The silica content of the composition was reduced by 2% so as to obtain a final viscosity of about 400 Pa × s at a shear rate of 1.56 s$^{-1}$.

The preparation of the composition, carried out at room temperature, proved feasible, although it required a time 50% longer than in Examples 2–4.

EXAMPLE 6

A hydrogen-absorbing composition was prepared using polybutene with the following characteristics:

| | |
|---|---|
| Numerical mean molecular weight | 11,000 |
| Kinematic viscosity at 50° C. (cSt) | 24,000 |
| Iodine Number (mg/g) | 80 | and adding the catalyst with the procedure and in the amount described in Example 2.

Preparation was carried out at a temperature of 50° C. to reduce the original viscosity of the polybutene used and enable the catalyst dispersion.

The composition was substantially solid at room temperature and no silica was incorporated thereto.

The composition proved impossible to apply into a cable.

EXAMPLE 7

A hydrogen-absorbing composition as described in Example 2 above was prepared using polybutadiene with the following characteristics:

| Numerical mean molecular weight | 1,800 |
| --- | --- |
| Kinematic viscosity at 50° C. (cSt) | 10,000 |
| Iodine Number (mg/g) | 3,100 |

A silica content of 1.5% was used in the composition to yield a final viscosity of about 400 Pa x s.

Preparation was carried out at a temperature of 50° C. to lower the viscosity of the polybutadiene used.

EXAMPLE 8

A composition comprising, expressed as percentages by weight of the overall weight thereof:

| Polybutene | 93.35 |
| --- | --- |
| Polybutadiene | 1.00 |
| Catalyst (palladiate charcoal) | 0.25 |
| Pyrogenous silica (2–300 Angstroms) | 5.00 |
| Antioxidant (Irganox 1076) | 0.4 | was obtained using polybutene with the following characteristics:

| Numerical mean molecular weight | 800 |
| --- | --- |
| Kinematic viscosity at 25° C. (cSt) | 10,000 |
| Iodine Number (mg/g) | 537 | and polybutadiene with the following characteristics:

| Numerical mean molecular weight | 800 |
| --- | --- |
| Kinematic viscosity at 50° C. (cSt) | 10,000 |
| Iodine Number (mg/g) | 3,100 |

The composition exhibited the following physical properties:

| Viscosity (at a shear rate of 1.56 s$^{-1}$) (Pa x s) | 380 |
| --- | --- |
| Density at 20° (g/cm$^3$) | 0.92 |
| Dripping point | above 200° C. |

EXAMPLE 9

A hydrogen-absorbing composition as in Example 2 above was prepared using an oil comprising 9-octodecenoic acid (oleic acid) with the following characteristics:

| Molecular weight | 268 |
| --- | --- |
| Kinematic viscosity at 25° C. (cSt) | 30 |
| Iodine Number (mg/g) | 80–90 |

The silica content used in the composition was approximately 15%, so as to obtain a final viscosity of about 400 Pa x s.

It should be noted that the amounts of silica specified in the previous Examples for making the mixtures thixotropic relate to a material with no surface treatment. Where the silica is subjected to surface treatments which result in its surface properties being altered, the amounts should be changed accordingly, as may be easily determined by a skilled man in the art.

EXAMPLE 10

The hydrogen-absorbing capacity of the above compositions was measured by a method based on the measurement of the pressure drop detected within a sealed vessel enclosing the material under test in a hydrogen atmosphere.

An automatic device was used to measure the pressure within the range of from 1,000 to 1 mbar.

The device includes a fixed volume chamber which is equipped with two valves (of which one is a needle valve controlling the inflow of hydrogen and the other is the usual type for connection to a vacuum pump), and has a pressure transducer mounted thereon which is connected to a digital reader.

The pressure transducer and digital reader actually employed were a Type E8510 and Type EMV251, respectively, both available from Edwards Alto Vuoto S.p.A..

A glass container is fitted inside the device.

The pressure control unit with digital readout has a resolution of 1 mbar, and the pressure reading is unrelated to the gas composition and the atmospheric pressure.

The tests were performed at a constant temperature of 23° C.

After weighing the glass container to a degree of accuracy within 0.01 g (weight A), the container bottom and walls were evenly coated with about 10 g of the substance to be tested.

After adding the substance, the glass container was once again weighed (weight B) to a degree of accuracy within 0.01 g.

The glass container containing the substance to be tested was introduced into the device and a vacuum was applied for about 1–2 hours.

After allowing the system under static vacuum for at least 12 hours, the container was connected to a hydrogen cylinder until the digital pressure gauge would read the desired pressure (generally, about 500 or 1,000 mbar).

The hydrogen cylinder valve was shut off and the time and pressure of the hydrogen were recorded.

After 24 hours, the residual hydrogen pressure was read.

The hydrogen-absorbing capacity, expressed in normal cm$^3$/g, was computed using the following formula:

$$\frac{(P - Pr) \times V \times 273}{1013 \times (273 + C) \times (B - A)}$$

where:

P=starting hydrogen pressure,

Pr=residual hydrogen pressure after 24-hour test,

C=temperature (° C.) during the test,

V=free volume of the apparatus after about 10 g of material has been coated,

B=weight of the glass container plus the material,

A=weight of the empty glass container.

The above test was performed twice for each sample of the hydrogen-absorbing composition and the mean of the two resultant values was taken.

The results obtained with the substances described in the previous Examples ape summarized in Table 1 below.

TABLE 1

|  | Ex. 4 | Ex. 2 | Ex. 3 | Ex. 5 | Ex. 6 | Ex. 7 | Ex. 8 | Ex. 9 |
| --- | --- | --- | --- | --- | --- | --- | --- | --- |
| Molecular weight | 450* | 800* | 950* | 1,250* | 11,000* | 1,800* | 0.0 | 268 |
| Viscosity (cSt, 25° C.) | 300 | 10,000 | 28.000 | 90,000 | 24,000** | 10,000** | 10,050 | 30 |
| Iodine Number (mg/g) | 916 | 537 | 349 | 300 | 80 | 3,100 | 562 | 80–90 |
| $H_2$ absor. (Nml/g) | 2.24 | 1.63 | 1.27 | 1.15 | 0.51 | 13.6 | 1.72 | 22.62 |
| $H_2$ absor.*** (Nml/g) | 0.09 | 0.0 | 0.0 | 0.05 | 0.0 | 0.0 | 0.0 | 0.0 |

*mean molecular weight
**viscosity at 50° C.
***without Pd catalyst

The tested polybutenes are sold by BP Chemicals snc, Tour Neptune Cedex, Paris, FR, under the trade name Napvis (Examples 2–5) and by ESSO Chemicals Co. Inc., New York, USA, under the trade name Vistanex LMMH (Example 6).

The polybutadiene tested is sold under the trade name Lithene AH by Revertex Ltd., Temple Fields, Harlow, Essex, GB.

EXAMPLE 11

The properties of the hydrogen-absorbing compositions of Examples 2 and 7 above were measured before and after exposure to air at 100° C. for 7 days, in thin (5 mm) layer, to check and compare for resistance to ageing (oxidation in air). The kinematic viscosity and O.I.T. (Oxygen Induction Time) data, taken as an index of oxidation resistance, were measured in conformity with ASTM Standards D445 and D4565 and are shown in Table 2 below.

TABLE 2

| Hydrocarbon compound | Example 2 | Example 7 |
| --- | --- | --- |
| Original viscosity at 100° C. (cSt) | 93 | 485 |
| Original OIT at 190° C. (h) | 63 | 3 |
| Viscosity at 100° C. after ageing (cSt) | 125 | 1,154* |
| OIT at 190° C. after ageing (h) | 31 | 3 |

From the data just shown it is deduced that, whereas with polybutene an increase of about 34% in viscosity from oxidation was obtained, the high reactivity of the polybutadiene double bonds to oxygen resulted in a viscosity increase of 138%, that is enough to substantially alter the composition properties. The formation of solid lumps was also observed whose presence in the vicinity of the fibers is apt to significantly enhance the signal attenuation by microbending.

It was also found that small amounts (below 5%) of polybutadiene dispersed through the polybutene mass exhibited significant ageing.

Ageing phenomena by oxidation of the hydrogen-absorbing composition are to be feared both in the finished cable—which is expected to remain in working order for a long time period (30 to 40 years)—and in the composition before its insertion into the cable.

In fact, the hydrogen-absorbing composition may have to be stored for a sufficiently long time to induce such ageing phenomena to set in.

The presence of suitable amounts of compatible antioxidants within the composition did not prove, on testing by the Applicant, adequate to prevent the onset of such phenomena when polybutadiene is used.

Further tests have shown that, while the presence of double bonds in the chain or in a terminal position of the hydrocarbon molecule does promote a desired absorption of hydrogen, aromatic compounds are ineffective. Tests performed with an aromatic oil commonly used as a plasticizer, and having a kinematic viscosity of about 6,000 cSt at 25° C. and a total content of aromatics of 84.4%, yielded a hydrogen absorption of about 0.05 Nml/g, which is one order of magnitude lower than the preferred absorption values and well below the minimum acceptable values previously specified.

Figure 5:
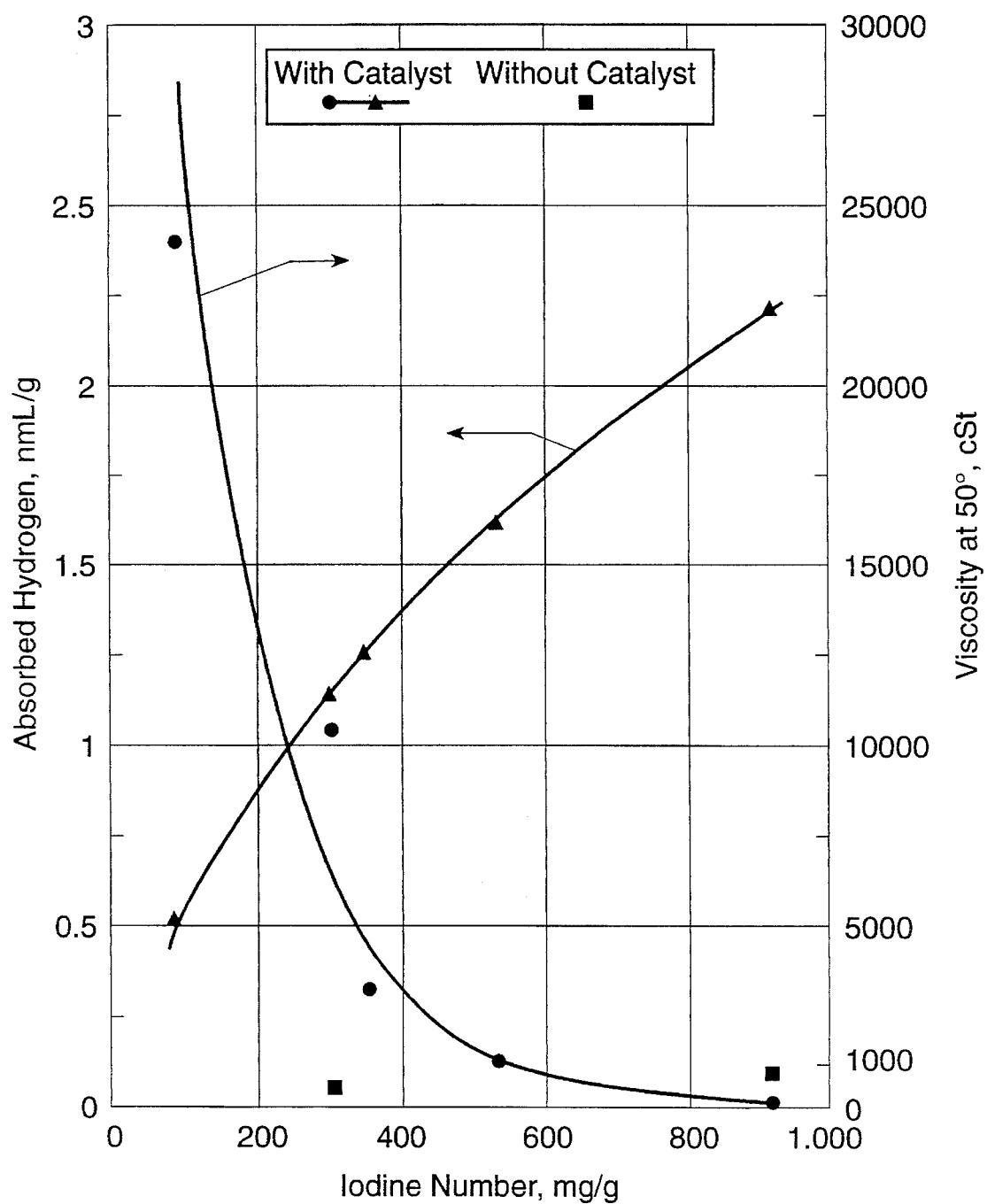
FIG. 5 shows the amount of hydrogen absorbed versus the degree of unsaturation of some hydrocarbons according to this invention, and corresponding viscosity thereof.
Figure 6:
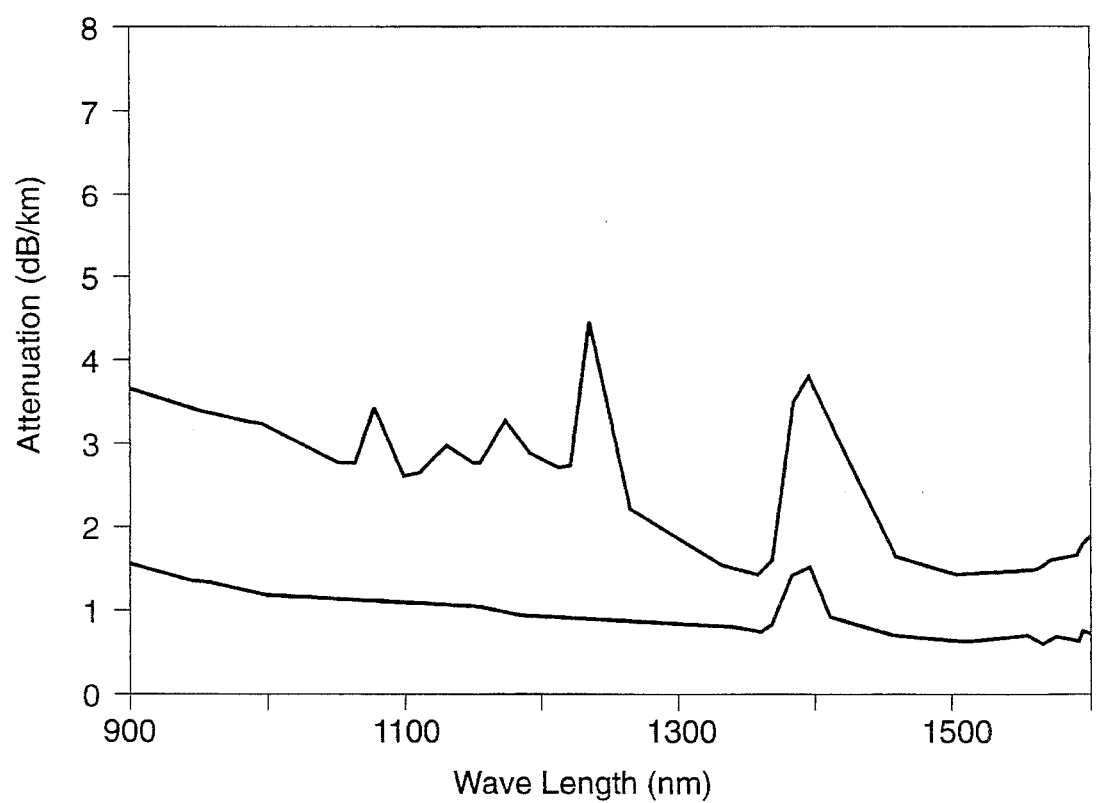
FIG. 6 shows the signal attenuation values versus wavelength in a fiber optics cable, in the presence and in the absence of the composition of this invention.

The results of the tests performed on the compositions of Examples 2 to 6 are graphically represented in FIG. 5, where measured values for the absorbed hydrogen and the viscosities of polybutenes are plotted against the number of double bonds (expressed as Iodine Number), and hence against the mean molecular weight of the polybutenes under test.

FIG. 5 shows that, to obtain a suitable composition for use as a hydrogen-absorbing composition in cables, critical parameters to be taken into account include not only the capacity of the selected hydrocarbon to absorb hydrogen, but also and primarily the hydrocarbon viscosity, which is to attain a value within the range of about 500 to about 10,000 cSt, preferably of about 1,000 to about 10,000 cSt, at 50° C.

It has been found, moreover, that among the hydrocarbons of the present invention, polybutene advantageously has a fraction in that viscosity range with adequate hydrogen-absorbing capacity to meet the application requirements, whereby a hydrogen-absorbing composition adapted for use in an optical fiber cable can be prepared.

In accordance with the foregoing, the polybutene should be provided in amounts of at least 90% by weight of the overall composition weight and should be substantially homogeneous.

The results of the above tests also show that, whereas substances having a large number of double bonds may appear desirable in order to impart a high hydrogen-absorbing capacity, this feature is not by itself sufficient to qualify any of them for use in cables, due to the other physico-chemical properties of such substances, e.g. viscosity before and after oxidation, which could render them of no use within optical fiber cables.

In fact, whereas the prior art pointed to the relative ineffectiveness of hydrocarbons having a single double bond in the chain when used in a optical fiber cable, suggesting at most that low molecular weight (and relatively low viscosity) hydrocarbons should be selected in order to increase the number of double bonds pep unit weight, according to the present invention it has unexpectedly been found that a homogeneous hydrocarbon having a limited number of double bonds in the chain and a viscosity within a critical range of values may be effectively used in hydrogen-absorbing compositions for optical fiber cables.

In particular, it has been experimentally found that a polybutene having the desired viscosity values which avoids the previously described side effects both in terms of stability of the composition and of its preparation conditions, exhibits a favourable activity with hydrogen, in the presence of a catalyst.

The ageing tests carried out have also shown that the presence of too large a number of double bonds and/or of excessively reactive double bonds leads in time to an unacceptable viscosity increase.

In other terms, it has been found that to provide a hydrogen-absorbing composition which comprises a hydrocarbon capable of absorbing hydrogen in the presence of a suitable catalyst, critical are not only its capacity to absorb hydrogen, but also its theological and chemical stability characteristics over time in the presence of hydrocarbon oxidizing agents.

These critical characteristics actually affect both its applicability into a cable and its performance throughout the service life of the cable.

From FIG. 5, it is also evinced that the polybutene is virtually unable to react with hydrogen under the temperature and pressure conditions anticipated for the cable in the absence of a catalyst.

Where the hydrogen-absorbing composition of this invention is to be used in the spaces Z1 or Z2, or to impregnate the sheaths 6 or 9, it may incorporate a catalyst of the kind described in the previous Examples, or a catalyst on a solid (powdered) support; where the inventive composition is instead to be placed in direct contact with the fibers, a homogeneous catalyst is preferred, e.g. as described in U.S. Pat. No. 5,140,664, or in any event—if in particulate form—one having a grain size smaller than 5 micrometers, in order to avoid causing attenuation phenomena in the optical fibers by microbending.

Where the composition is applied in contact with the optical fibers, the above limitations become even more critical, both as to viscosity at room temperature and stability to oxidation over time.

From the foregoing description and illustration, the numerous advantages afforded by this invention can be at once appreciated.

In fact, the invention can provide effective protection for the optical fibers 3 against the diffusion of hydrogen therethrough, by irreversible chemical absorption of the hydrogen.

This irreversible chemical absorption may advantageously take place at the cable operating temperature by virtue of a suitable catalyst being homogeneously dispersed within the composition.

Furthermore, the tests carried out confirm that the composition of the present invention is effective to absorb the hydrogen, as well as being particularly stable from a physico-chemical standpoint both while in use and during the fiber optics cable manufacture.

Lastly, it should be noted that particularly beneficial features can be afforded by the invention where said homogeneous hydrocarbon is polybutene, a raw material of low cost and readily available on the market.

We claim:

1. An optical fiber telecommunications cable comprising at least one optical fiber received in a respective housing of an optically conductive core and comprising, in at least a portion of its internal volume, a hydrogen-absorbing composition including:

a non-aromatic unsaturated hydrocarbon compound; and a catalyst selected from a group including the transition metals, salts and organic and inorganic complexes of the transition metals wherein said hydrocarbon compound comprises at least 90% of a substantially homogeneous silicon-free hydrocarbon which is not obtained by polymerization of monomers including conjugate dienes, and having a viscosity in the 500 to 70,000 cSt range at room temperature, and a viscosity below 70,000 cSt at room temperature, after ageing by exposure to air in thin layer for at least 7 days at 100° C.;

said hydrocarbon compound having double bonds reactive to hydrogen at room temperature, in a corresponding amount to an iodine number in the 70 to 1,000 mg/g range.

2. The optical fiber cable of claim 1 wherein said hydrocarbon compound has a viscosity at room temperature higher than 1,000 cSt.

3. The optical fiber cable of claim 1 wherein said hydrocarbon compound is effective to chemically absorb at least 0.8 Nml/g of hydrogen at room temperature.

4. The optical fiber cable of claim 1 wherein said substantially homogeneous hydrocarbon is selected from the group including: polybutene; propylene-ethylene, propylene-butene and propylene-hexene copolymers; propylene-butene-ethylene terpolymers; synthetic or naturally occurring (castor oil) glyceryl ricinoleate; and rosin oil.

5. The optical fiber cable of claim 4 wherein said substantially homogeneous hydrocarbon is polybutene.

6. The optical fiber cable of claim 5 wherein said polybutene has a numerical mean molecular weight of from 500 to 1,300.

7. The optical fiber cable of claim 6 wherein said polybutene has a molecular weight distribution within a range of ±20% with respect to said numerical mean molecular weight.

8. The optical fiber cable of claim 1 wherein it comprises an amount not exceeding 5% by weight of a second, substantially homogeneous unsaturated hydrocarbon selected from a group including unsaturated polymers obtained by polymerization of at least one conjugate diene.

9. The optical fiber cable of claim 8 wherein said second unsaturated hydrocarbon is selected from the group including polymers obtained by polymerization of butadiene, pentadiene, methyl-butadiene, and 2-chlorobutadiene.

10. The optical fiber cable of claim 9 wherein said second unsaturated hydrocarbon is polybutadiene having a numerical mean molecular weight of from 1,500 to 2,000.

11. The optical fiber cable of claim 1 wherein said hydrogen-absorbing composition is thixotropic.

12. The optical fiber cable of claim 11 wherein said hydrogen-absorbing composition comprises from 15 to 10% by weight of silica.

13. The optical fiber cable of claim 1 wherein said housing for said optical fiber is surrounded by a sheath comprising a fibrous support.

14. The optical fiber cable of claim 1 or 13 wherein said housing for said optical fiber comprises a tubular element containing said optical fiber.

15. The optical fiber cable of claim 1 or 13 wherein said housing for said optical fiber is defined between a cylindrical core provided with at least one groove and at least one closing sheath.

16. The optical fiber cable of claim 13 wherein said internal volume portion including said hydrogen-absorbing composition comprises said fibrous support.

17. The optical fiber cable of claim 14 wherein said internal volume portion including said hydrogen-absorbing composition extends between said tubular element and said sheath.

18. The optical fiber cable of claim 1 wherein it includes tension members and at least an internal volume portion including said hydrogen-absorbing composition being defined between said tension members.

19. A hydrogen-absorbing composition for optical fiber cables, comprising:

a non-aromatic unsaturated hydrocarbon compound;

a catalyst selected from a group including the transition metals, salts and organic and inorganic complexes of the transition metals wherein said hydrocarbon compound comprises at least 90% of a substantially homogeneous silicon-free hydrocarbon which is not obtained by polymerization of monomers including conjugate dienes, and having a viscosity in the 500 to 70,000 cSt range at room temperature, and a viscosity below 70,000 cSt at room temperature, after ageing by exposure to air in thin layer for at least 7 days at 100° C.;

said hydrocarbon compound having double bonds reactive to hydrogen at room temperature, in a corresponding amount to an iodine number in the 70 to 1,000 mg/g range.

20. The hydrogen-absorbing composition for optical fiber cables of claim 19 wherein said hydrocarbon compound has a viscosity at room temperature higher than 1,000 cSt.

21. The hydrogen-absorbing composition for optical fiber cables of claim 19 wherein said hydrocarbon compound is effective to chemically absorb at least 0.8 Nml/g of hydrogen at room temperature.

22. The hydrogen-absorbing composition for optical fiber cables of claim 19 wherein said substantially homogenous hydrocarbon is selected from the group including: polybutene; propylene-ethylene, propylene-butene and propylene-hexene copolymers; propylene-butene-ethylene terpolymers; synthetic or naturally occurring (castor oil) glyceryl ricinoleate; and rosin oil.

23. The hydrogen-absorbing composition for optical fiber cables of claim 22 wherein said substantially homogeneous hydrocarbon is polybutene.

24. The composition of claim 23 wherein said polybutene has a numerical mean molecular weight of from 500 to 1,300.

25. The composition of claim 24 wherein said polybutene has a molecular weight distribution within a range of ±20% with respect to said numerical mean molecular weight.

26. The composition of claim 19 comprising an amount not exceeding 5% by weight of a second, substantially homogeneous unsaturated hydrocarbon selected from a group including unsaturated polymers obtained by polymerization of at least one conjugate diene.

27. The composition of claim 26 wherein said second unsaturated hydrocarbon is selected from a group including polymers obtained by polymerization of butadiene, pentadiene, methyl-butadiene, and 2-chlorobutadiene.

28. The composition of claim 27 wherein said second unsaturated hydrocarbon is polybutadiene having a numerical mean molecular weight of from 1,500 to 2,000.

29. The composition of claim 19 wherein it is thixotropic.

30. The composition of claim 29 wherein it comprises from 1% to 20% by weight of powdered silica.

* * * * *

UNITED STATES PATENT AND TRADEMARK OFFICE
CERTIFICATE OF CORRECTION

PATENT NO. : 5,455,881
DATED : October 3, 1995
INVENTOR(S) : Bosisio et al

It is certified that error appears in the above-indentified patent and that said Letters Patent is hereby corrected as shown below:

On the title page: Item [54] and

Col. 1, line 4, in the Title, change "incorporations" to --incorporating--

Col. 5, line 47, change "theo-" to --rheo- --

Col. 8, line 23, change "fop" to --for--

Col. 13, line 5, change "ape" to --are--

Col. 13, line 46 should read --*: the formation of a gummy surface layer was observed--

Col. 15, line 19, change "theological" to --rheological--.

Signed and Sealed this

Thirteenth Day of February, 1996

Attest:

BRUCE LEHMAN

*Attesting Officer*     *Commissioner of Patents and Trademarks*